United States Patent
Lee et al.

(10) Patent No.: US 9,774,274 B2
(45) Date of Patent: Sep. 26, 2017

(54) ACTIVE RECTIFIER AND WIRELESS POWER RECEIVING APPARATUS USING THE SAME THAT CAN REDUCE REVERSE CURRENT LEAKAGE

(71) Applicant: Research & Business Foundation SUNGKYUNKWAN UNIVERSITY, Suwon-si (KR)

(72) Inventors: Kang Yoon Lee, Seoul (KR); Jae Hyung Jang, Seoul (KR); Hyung Gu Park, Seoul (KR); Joo Young Chun, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 348 days.

(21) Appl. No.: 14/657,271

(22) Filed: Mar. 13, 2015

(65) Prior Publication Data
US 2015/0263534 A1    Sep. 17, 2015

(30) Foreign Application Priority Data

Mar. 14, 2014 (KR) .......... 10-2014-0030340

(51) Int. Cl.
*H02M 7/219* (2006.01)
(52) U.S. Cl.
CPC .... *H02M 7/219* (2013.01); *H02M 2007/2195* (2013.01); *Y02B 70/1408* (2013.01)
(58) Field of Classification Search
CPC .......... H02M 7/219; H02M 2007/2195; Y02B 70/1408

USPC .......... 307/104, 107, 112, 113, 145
See application file for complete search history.

(56) References Cited

U.S. PATENT DOCUMENTS

| | | | | |
|---|---|---|---|---|
| 6,324,084 | B1* | 11/2001 | Fujisawa | G04G 19/02 363/127 |
| 2004/0136209 | A1* | 7/2004 | Hosokawa | H02M 3/33592 363/24 |
| 2012/0051109 | A1* | 3/2012 | Kim | H02M 7/217 363/127 |
| 2013/0141025 | A1* | 6/2013 | Takamori | H02H 3/003 318/400.21 |

(Continued)

OTHER PUBLICATIONS

H. G. Park et al., "Design of Transceiver Circuit for Wireless Power Transmission," *The Journal of the Korean Institute of Communication Sciences*, vol. 30, No. 11, Nov. 2013, pp. 60-67 (1 page in English, 8 pages in Korean).

*Primary Examiner* — William Hernandez
(74) *Attorney, Agent, or Firm* — NSIP Law (57) ABSTRACT

An active rectifier and a wireless power reception apparatus using the same are disclosed herein. The active rectifier includes first and fourth switches, second and third switches, and a synchronization control unit. The first and fourth switches are turned on while the voltage of an alternating current (AC) input is negative, and apply the current of the AC input to a rectifying capacitor. The second and third switches are turned on while a voltage of the AC input is positive, and apply the current of the AC input to the rectifying capacitor. The synchronization control unit compensates for the delay time of the comparator for detecting zero-crossing of the AC input so as to switch the first to fourth switches.

10 Claims, 9 Drawing Sheets

(56) References Cited

U.S. PATENT DOCUMENTS

2013/0235635 A1* 9/2013 Takahagi .............. H02M 7/219
 363/127
2015/0146466 A1* 5/2015 Kim ...................... H02M 7/219
 363/127

* cited by examiner

ACTIVE RECTIFIER AND WIRELESS POWER RECEIVING APPARATUS USING THE SAME THAT CAN REDUCE REVERSE CURRENT LEAKAGE

CROSS-REFERENCE TO RELATED APPLICATIONS

This application claims the benefit under 35 U.S.C. §119 (a) of Korean Patent Application No. 10-2014-0030340, filed on Mar. 14, 2014, in the Korean Intellectual Property Office, the entire disclosure of which is incorporated herein by reference for all purposes.

BACKGROUND

1. Technical Field

The present invention relates to wireless power transmission technology and, more particularly, to a rectifier in a wireless power reception apparatus.

2. Description of the Related Art

Wireless power transmission technology based on electromagnetic waves initially started with technology for sending power over a long or short distance in such a manner that a power transmitter sends electromagnetic waves having high energy in a desired direction and a power receiver receives the transmitted electromagnetic waves, and has not overcome the problem in which it has very low efficiency and is harmful to the human body.

Wireless power transmission technology using magnetic induction scheme has been attempted since the discovery of a magnetic induction phenomenon, and includes many commercialized cases. However, distance allowable between power transmitter and power receiver is very short, a large amount of heat is generated, usability is bad because charging efficiency highly varies depending on the locations of the power transmitter and the power receiver, and, above all, the amount of transmission power is limited.

Wireless power transmission technologies that had been at standstill as described above are dramatically advancing after Martin Soljacic at MIT announced a new transmission technology using magnetic resonance scheme in 2007.

Magnetic resonance is evanescent wave coupling phenomenon in which when two media resonate at the same frequency, electromagnetic waves move from one medium to the other medium through short-distance magnetic field. The wireless power transmission technology using a magnetic resonance scheme can transfer higher power to farther location with very high efficiency.

The rectifier of a wireless power reception apparatus performs function similar to that of a common Alternating Current (AC)-Direct Current (DC) rectifier. The efficiency of the rectifier exerts large influence on the overall efficiency of wireless power transmission. Passive rectifiers using diode bridges suffer from loss in peak voltage due to voltage drop generated by diodes.

This voltage drop problem can be overcome using active elements, instead of the diodes. Reverse current leakage may be generated inversely from DC output to AC input in the diode-connected active elements depending on sections of AC input waveform. Such leaking reverse current degrades efficiency.

Although such reverse current can be reduced by fully turning off the diode-connected active elements depending on sections of AC input waveform, reverse current may still occur during a delay time because it takes time to turn off the active elements.

SUMMARY

At least some embodiments of the present invention are directed to the provision of an active rectifier capable of reducing a reverse current leakage, and a wireless power reception apparatus using the same.

At least some embodiments of the present invention are directed to the provision of an active rectifier capable of reducing reverse current leakage using a delay compensation means for compensating a delay time to take for active elements to turn off, and a wireless power reception apparatus using the same.

In accordance with an aspect of the present invention, there is provided an active rectifier, including: first and fourth switches turned on while the voltage of an alternating current (AC) input is negative, so as to apply the current of the AC input to a rectifying capacitor; second and third switches turned on while the voltage of the AC input is positive, so as to apply a current of the AC input to the rectifying capacitor; and a synchronization control unit for compensating for a delay time of the comparator for detecting zero-crossing of the AC input so as to switch the first to fourth switches.

The first to fourth switches may be implemented using N channel field effect transistors.

The active rectifier may further include a first level shifter or second level shifter for compensating for threshold voltage in order to switch the third switch or the fourth switch.

The active rectifier may further include a voltage booster for generating a boost voltage to be supplied to the first and the second level shifters so that the first and the second level shifters operate in a voltage level higher than a peak voltage level of the AC input by at least a threshold voltage of a semiconductor device.

The synchronization control unit may be configured to: compensate for the delay time of the comparator for detecting zero-crossing time of the AC input so as to switch the first and the second switches; and compensate for delay time of the comparator for detecting zero-crossing of the AC input and delay time of one of the first and second level shifters, so as to switch the third and fourth switches.

The synchronization control unit may include a digital delay-locked loop (DLL) configured to: generate a delay comparison signal by delaying a comparison signal output from the comparator for detecting zero-crossing of the AC input; generate a reference delay signal by passing the delay comparison signal through a replica delay line having a compensation delay time identical with the delay time of the comparator or delay time of the comparator and the level shifter altogether; and generate first to fourth switch control signals for switching the first to fourth switches, based on the delay comparison signal obtained by synchronizing the reference delay signal with the comparison signal.

The synchronization control unit may be configured to: generate a coarse delay comparison signal by delaying the comparison signal output from the comparator by a coarse delay time; select a candidate delay signal from candidate delay signals obtained by finely delaying the coarse delay comparison signal respectively by different fine delay times; determine the coarse delay time so that a phase of a first reference delay signal, obtained by further delaying the selected candidate delay signal by the compensation delay time, is synchronized with a phase of the comparison signal;

select a candidate delay signal from candidate delay signals obtained by further finely delaying a coarse delay comparison signal respectively by different fine delay times, the coarse delay comparison signal being delayed by the determined coarse delay time previously; determine a fine delay time when a phase of a second reference delay signal, obtained by further delaying the selected candidate delay signal by a compensation delay time, is synchronized with the phase of the comparison signal; and output a candidate delay signal, corresponding to the determined fine delay time, as a switch control signal.

The digital DLL may include: a coarse delay line for comprising a first plurality of delay cells, serially connected and having delay times respectively determined in response to a coarse delay control signal, so as to output a coarse delay comparison signal by passing the comparison signal through the first plurality of delay cells; a fine delay line for outputting a plurality of candidate delay signals, whose phases are gradually delayed, from each of a second plurality of delay cells, being serially connected, while passing the coarse delay comparison signal through the second plurality of delay cells; a phase selector for selecting one from the plurality of candidate delay signals in response to a fine delay control signal; a replica delay line for delaying the selected candidate delay signal by the compensation delay time; a coarse phase detector for synchronizing a phase of the comparison signal with a phase of a first reference delay signal, which is the selected candidate delay signal having passed through the replica delay line, so as to output a coarse delay lock signal; a fine phase detector for synchronizing, in response to the coarse delay lock signal, the phase of the comparison signal with a phase of a second reference delay signal, which is the selected candidate delay signal having passed through the replica delay line; and a shift register for generating the fine delay control signal based on a comparison between the phases of the comparison signal and the second reference delay signal, so as to output the generated fine delay control signal to the phase selector.

In accordance with another aspect of the present invention, there is provided a wireless power reception apparatus, including: a resonant reception coil for receiving a radio signal, so as to generate a waveform of an AC input; an active rectifier for comprising first and fourth switches turned on while a voltage of the AC input is negative so as to apply a current of the AC input to a rectifying capacitor and second and third switches turned on while a voltage of the AC input is positive so as to apply a current of the AC input to the rectifying capacitor, and for compensating for a delay time of a comparator for detecting zero-crossing of the AC input so as to switch the first to fourth switches; and a low loss regulator for generating a DC voltage from a voltage charged in the rectifying capacitor.

In accordance with still another aspect of the present invention, there is provided a delay compensation method of controlling a synchronization of an active rectifier, the active rectifier including first and fourth switches turned on while a voltage of an AC input is negative so as to apply a current of the AC input to a rectifying capacitor and second and third switches turned on while a voltage of the AC input is positive so as to apply a current of the AC input to the rectifying capacitor, the delay compensation method including: generating a coarse delay comparison signal by delaying a comparison signal, output from a comparator for detecting zero-crossing of the AC input, by a coarse delay time; selecting a candidate delay signal from candidate delay signals obtained by finely delaying the coarse delay comparison signal by different fine delay times; determining a coarse delay time so that a phase of a first reference delay signal, obtained by further delaying the selected candidate delay signal by a compensation delay time, is synchronized with a phase of the comparison signal; selecting a candidate delay signal from candidate delay signals obtained by further finely delaying a coarse delay comparison signal by different fine delay times, the coarse delay comparison signal being delayed by the determined coarse delay time previously; determining a fine delay time when a phase of a second reference delay signal, obtained by further delaying the selected candidate delay signal by a compensation delay time, is synchronized with the phase of the comparison signal; and outputting a candidate delay signal, corresponding to the determined fine delay time, as a switch control signal.

The active rectifier may further include level shifters configured to compensate for threshold voltages of the third and the fourth switches; and the compensation delay time may be equal to the delay time of the comparator in the case of first and second switch control signals, and may be the sum of delay times of the comparator and the level shifter in the case of third and fourth switch control signals.

In accordance with still another aspect of the present invention, there is provided a method of controlling a synchronization of an active rectifier, the active rectifier including first and fourth switches turned on while a voltage of an AC input is negative so as to apply a current of the AC input to a rectifying capacitor, second and third switches turned on while a voltage of the AC input is positive, and level shifters for compensating for threshold voltages of the third and the fourth switches, the method including: Outputting a first switch control signal by compensating a first comparison signal for a delay of a first comparator, the first comparison signal being output by the first comparator so as to be activated when the AC input turns from positive to negative and deactivated when the AC input turns from negative to positive; Outputting a second switch control signal by compensating a second comparison signal for a delay of a second comparator, the second comparison signal being output by the second comparator so as to be activated when the AC input turns from negative to positive and deactivated when the AC input turns from positive to negative; Outputting a third switch control signal by compensating a third comparison signal for a delay of a third comparator, the third comparison signal being output by the third comparator so as to be activated when the AC input turns from negative to positive and deactivated when the AC input turns from positive to negative; Outputting a fourth switch control signal by compensating a fourth comparison signal for a delay of a fourth comparator, the fourth comparison signal being output by the fourth comparator so as to be activated when the AC input turns from positive to negative and deactivated when the AC input turns from negative to positive; turning on the first and the fourth switches using the first and the fourth switch control signals while a voltage of the AC input is negative, so as to apply a current of the AC input to the rectifying capacitor; and turning on the second and the third switches using the second and the third switch control signals while a voltage of the AC input is positive, so as to apply a current of the AC input to the rectifying capacitor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and redundant descriptions of the same components will be omitted.

Figure 1:
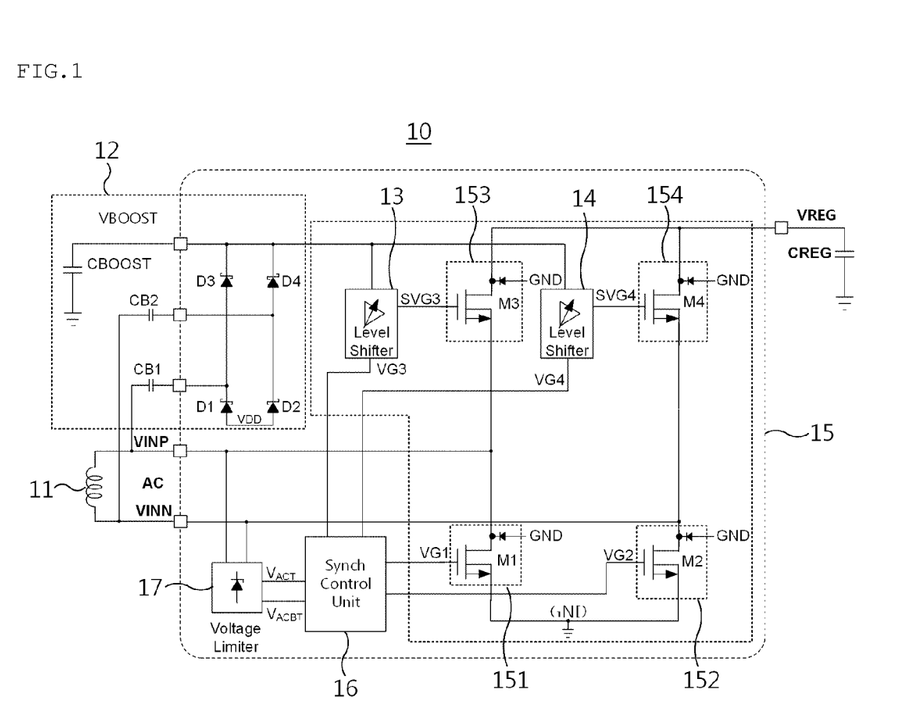
FIG. 1 is a conceptual diagram illustrating an active rectifier according to an embodiment of the present invention.

FIG. 1 is a conceptual diagram illustrating an active rectifier according to an embodiment of the present invention.

Referring to FIG. 1, the active rectifier 10 may include a resonant reception coil 11, a voltage booster 12, first and second level shifters 13 and 14, a synchronous rectification circuit unit 15, and a synchronization control unit (Synch Control Unit) 16. In some embodiments, in order to protect a rectification circuit, the active rectifier 10 may further include a voltage limiter 17 configured to enable the synchronization control unit 16 to turn off all the switches 151 to 154 of the synchronous rectification circuit unit 15 depending on the swing width of an AC voltage.

The resonant reception coil 11 receives electromagnetic signal having a specific resonant frequency transmitted by the transmission side, and generates AC input AC between AC input terminals VINP and VINN. The resonant reception coil 11 may be designed based on design factors, such as specific quality factor (Q) value and the number of turns, so that maximum input current can be obtained at a frequency that will generate magnetic resonance.

The voltage booster 12 may be implemented using, for example, a bootstrap voltage booster so that the first and the second level shifters 13 and 14 operate in a voltage level that is higher than peak voltage level of the AC input AC by at least the threshold voltage of a semiconductor device. The voltage booster 12 may generate a boost voltage VBOOST, and supply it to the first and the second level shifters 13 and 14.

The voltage booster 12 of FIG. 1 is implemented using bootstrap capacitors CB1 and CB2 and Schottky diodes having a low forward voltage drop, fast switching and low junction capacitance. The boost voltage VBOOST is maintained by a booster capacitor CBOOST.

An exemplary operation of the voltage booster 12 is described in brief below with reference to the half circuit of the voltage booster 12.

During the negative half cycle of the AC input AC, a first Schottky diode D1 and a third Schottky diode D3 are turned on, and the boost capacitor CBOOST is charged by a DC voltage VDD supplied by the low drop out (LDO) regulator of a following stage. The voltage charged in the boost capacitor CBOOST is a voltage that is obtained by subtracting a voltage drop of the first and the third Schottky diodes D1 and D3 from the DC voltage VDD.

During the positive half cycle of the AC input AC, the first Schottky diode D1 is turned off, and an additional voltage proportional to a positive AC input VINP may be further charged through the third Schottky diode D3.

Through this operation, the voltage booster 12 may generate the boost voltage VBOOST of a voltage level that is higher than a peak voltage level of the AC input AC by at least the threshold voltage of a semiconductor device, such as a transistor, and may supply the generated boost voltage VBOOST to the first and the second level shifters 13 and 14.

The voltage booster 12 is not limited to the configuration illustrated in FIG. 1. As long as the above purpose can be achieved, the voltage booster 12 may be easily replaced with a known or newly designed bootstrap voltage booster apart from the configuration of FIG. 1.

The first and the second level shifters 13 and 14 receive third and fourth switch control signals VG3 and VG4 output by the synchronization control unit 16, and respectively generate third and fourth switch control signals SVG3 and SVG4 whose levels have been shifted to a voltage level higher than a peak voltage level of the AC input AC by at least the threshold voltage of a semiconductor device, such as a transistor.

The third and the fourth switch control signals SVG3 and SVG4 whose levels have been shifted by the first and the second level shifters 13 and 14 may be applied to the control terminals of the third and the fourth switches 153 and 154 on the upper side of the synchronous rectification circuit unit 15, that is, the gates of third and the fourth transistors M3 and M4 implemented using N channel transistors.

The synchronous rectification circuit unit 15 includes the first and the fourth switches 151 and 154 turned on while the voltage of the AC input AC is negative and configured to apply the current of the AC input AC to a rectifying capacitor CREG, and the second and the third switches 152 and 153 turned on while the voltage of the AC input AC is positive and configured to apply the current of the AC input AC to the rectifying capacitor CREG.

More specifically, the synchronous rectification circuit unit 15 may include the first switch 151 between the first terminal VINP of the AC input AC and a ground terminal GND, the second switch 152 between the second terminal VINN of the AC input AC and the ground terminal GND, the third switch 153 between the first terminal VINP of the AC input AC and a DC output terminal VREG, and the fourth switch 154 between the second terminal VINN of the AC input AC and the DC output terminal VREG.

While the first terminal VINP of the AC input AC is positive, the first switch 151 and the fourth switch 154 are turned off, and the second switch 152 and the third switch 153 are turned on. Accordingly, an electric current flows from the first terminal VINP to the DC output terminal VREG through the current path of the ground terminal GND, the second switch 152, the first and the second terminals VINP, VINN of the AC input AC and the third switch 153, so that the electric current is charged in the rectifying capacitor CREG.

While the first terminal VINP of the AC input AC is negative, the first switch 151 and the fourth switch 154 are turned on, and the second switch 152 and the third switch 153 are turned off. Accordingly, an electric current flows from the second terminal VINN to the DC output terminal VREG through the current path of the ground level GND, the first switch 151, the first and the second terminals VINP, VINN of the AC input AC, and the fourth switch 154, so that the electric current is charged in the rectifying capacitor CREG.

In some embodiments, each of the first to fourth switches 151, 152, 153 and 154 may be implemented using an N channel field effect transistor (FET), and may be implemented using an N channel metal oxide semiconductor FET (MOSFET), that is, an NMOS transistor.

In particular, if the third and the fourth switches 153 and 154 on the upper side of the synchronous rectification circuit unit 15 are implemented using NMOS transistors, a power loss becomes low, and efficiency can be generally further improved because they have low "ON" resistance compared to a case where the third and the fourth switches 153 and 154 are implemented using PMOS transistors.

In this case, there is a problem in which the NMOS transistor operates only when a gate-source voltage is higher than a threshold voltage. In order to solve this problem, the first and the second level shifters 13 and 14 apply the third and the fourth switch control signals SVG3 and SVG4 obtained by shifting the levels of the third and the fourth switch control signals VG3 and VG4, output by the synchronization control unit 16, to voltage levels higher than a peak voltage level of the AC input AC by at least the threshold voltage of a semiconductor device, such as a transistor, to the control terminals of the third and the fourth switches 153, 154, that is, to the gate terminals of the third and the fourth transistors M3 and M4 using the N channel transistors, as described above. Furthermore, for the level shift operation of the first and the second level shifters 13 and 14, the boost voltage VBOOST is supplied to the first and the second level shifters 13 and 14 through the voltage booster 12.

When an internal delay time is not compensated for, the first to fourth switches 151, 152, 153 and 154 are not turned off exactly when they need to be turned off, and are turned off late. Accordingly, the first to fourth switch control signals VG1, VG2, VG3 and VG4 generated by the synchronization control unit 16 in order to control the first to fourth switches 151, 152, 153 and 154 may generate a reverse current leakage in which an electric current inversely flows from the DC output terminal to the AC input terminal. Furthermore, if the switches are turned on longer than a while they need to be turned on, this contributes to a loss because a chance to convert an AC current is also lost to that extent.

Figure 2:
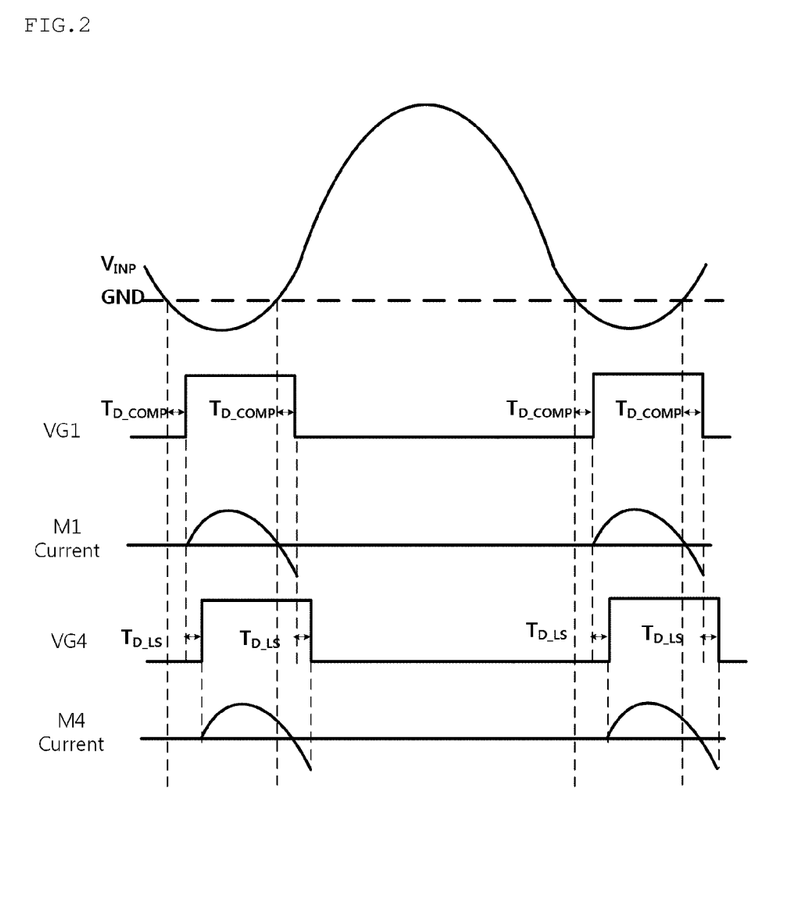
FIG. 2 is a waveform diagram illustrating switching delay components that need to be taken into consideration in the active rectifier according to an embodiment of the present invention.

This phenomenon is described in brief with reference to FIG. 2. FIG. 2 is a waveform diagram illustrating switching delay components that need to be taken into consideration in the active rectifier according to an embodiment of the present invention.

In FIG. 2, the AC input AC in the first terminal VINP shows a waveform having a positive section in which the AC input is higher than the ground level GND in most time sections and a negative section in which the AC input is lower than the ground level GND in some time section.

A reverse current leakage occurs because the first and the fourth switch control signals VG1 and VG4 are not generated and delivered to the first and the fourth switches 151 and 154 at an appropriate time, but they reach the first and the fourth switches 151 and 154 after some delay time $T_{D\_COMP}$ when the AC input AC switches from negative to positive. In other words, the reverse current leakage occurs during a short delay time $T_{D\_COMP}$ during which the first and the fourth switches 151 and 154 are turned off after some delay without being immediately turned off. One of the major causes for such delay is a comparator that detects zero-crossing of the AC input.

In particular, the fourth switch control signal VG4 delivered to the fourth switch 154 is longer delayed because it has a longer delay time $T_{D\_LS}$ corresponding to delay generated while it passes through the level shifter 14.

Accordingly, while the first switch 151 and the fourth switch 154 are turned on, a current path from the first terminal VINP of the AC input AC to the ground level GND via the first switch 151 is formed, and a current path from the DC output terminal VREG to the second terminal VINN of the AC input AC via the fourth switch 154 is formed.

Since the second switch 152 is delayed by the delay time $T_{D\_COMP}$ and then turned on, the electric power of the AC input AC is lost through the first switch 151 during the delay, and electric power previously charged in the rectifying capacitor CREG is lost through the fourth switch 154.

When the AC input AC switches from positive to negative, the first switch 151 is late turned on by the delay time $T_{D\_COMP}$, and the fourth switch 154 is further late turned on by the delay time $T_{D\_LS}$. Accordingly, electric power of the AC input AC is thermally lost to that extent.

The efficiency of a conventional wireless power reception apparatus is only 50% due to such a reverse current leakage phenomenon and other loss factors.

Referring back to FIG. 1, the synchronization control unit 16 of the active rectifier 10 according to an embodiment of the present invention generates the first and the second switch control signals VG1 and VG2, that compensate for the delay time of comparators for detecting zero-crossing of the AC input, for the first and the second switches 151 and 152, and generates the third and the fourth switch control signals VG3 and VG4 that compensate for the delay time of the comparators and the level shifters for the third and the fourth switches 153 and 154.

The generated first and the second switch control signals VG1 and VG2 are applied to the first and the second switches 151 and 152. The generated third and the fourth switch control signals VG3 and VG4 are applied to the third and the fourth switches 153 and 154 as the third and the fourth switch control signals SVG3 and SVG4 whose levels have been shifted through the first and the second level shifters 13 and 14.

Figure 3:
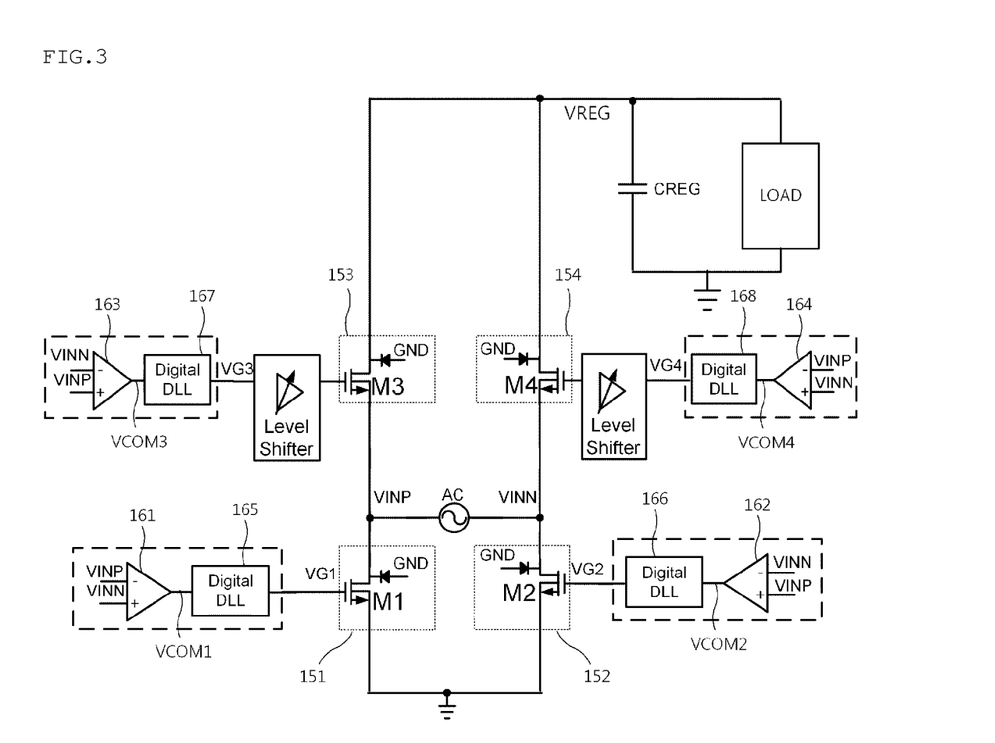
FIG. 3 is a detailed block diagram of the synchronization control unit and synchronous rectification circuit unit of the active rectifier according to an embodiment of the present invention.

The operation of the synchronization control unit 16 is described in more detail with reference to FIG. 3. FIG. 3 is a detailed block diagram of the synchronization control unit and synchronous rectification circuit unit of the active rectifier according to an embodiment of the present invention.

In FIG. 3, the synchronization control unit 16 may include a plurality of comparators 161, 162, 163 and 164 for the four switches 151, 152, 153 and 154 and a plurality of digital delay-locked loops (DLLs) 165, 166, 167 and 168.

More specifically, the synchronization control unit 16 generates the first to the fourth switch control signals VG1, VG2, VG3 and VG4 for appropriately switching the first to fourth switches 151, 152, 153 and 154, respectively, when the waveform of the AC input AC turns from negative to positive or from positive to negative.

For this purpose, the synchronization control unit 16 may include the first DLL 165 configured to output the first switch control signal VG1 by compensating for the delay of a first comparison signal VCOM1 output by the first comparator 161 so that the first switch control signal VG1 is activated when the AC input AC turns from positive to negative and deactivated when the AC input AC turns from negative to positive; the second DLL 166 configured to output the second switch control signal VG2 by compensating for the delay of a second comparison signal VCOM2 output by the second comparator 162 so that the second switch control signal VG2 is activated when the AC input AC turns from negative to positive and deactivated when the AC input AC turns from positive to negative; the third DLL 167 configured to output the third switch control signal VG3 by compensating for the delay of a third comparison signal VCOM3 output by the third comparator 163 so that the third switch control signal VG3 is activated when the AC input AC turns from negative to positive and deactivated when the AC input AC turns from positive to negative; and the fourth DLL 168 configured to output the fourth switch control signal VG4 by compensating for the delay of a fourth comparison signal VCOM4 output by the fourth comparator 164 so that the fourth switch control signal VG4 is activated when the AC input AC turns from positive to negative and deactivated when the AC input AC turns from negative to positive.

In some embodiments, the first comparison signal VCOM1 and the fourth comparison signal VCOM4 are in phase, and the second comparison signal VCOM2 and the third comparison signal VCOM3 are in phase. Accordingly, the second and the third DLLs 166 and 167 may share the second comparison signal VCOM2 of the second comparator 162, and the first and the fourth DLLs 165 and 168 may share the first comparison signal VCOM1 of the first comparator 161.

Furthermore, in some embodiments, the first comparison signal VCOM1 and the fourth comparison signal VCOM4 have a waveform reversed from the waveform of the second comparison signal VCOM2 and the third comparison signal VCOM3. Accordingly, the second and the third DLLs 166 and 167 may use the inverted signal of the first comparison signal VCOM1 of the first comparator 161, and the first and the fourth DLLs 165, 168 may use the inverted signal of the first comparison signal VCOM1 of the first comparator 161. In this case, the second and the third DLLs 166 and 167 may generate the second and the third switch control signals VG2 and VG3 by also compensating for delay generated when the first comparison signal VCOM1 is inverted.

Figure 4:
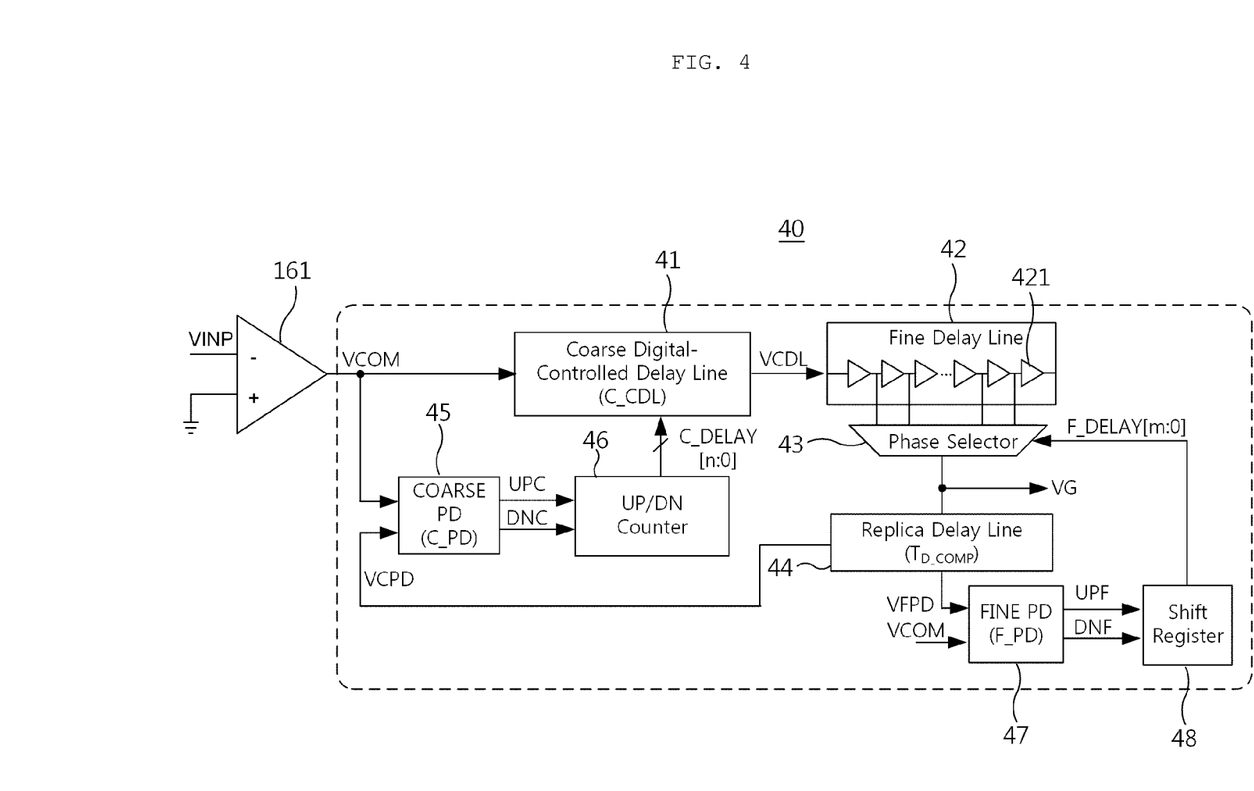
FIG. 4 is a more detailed block diagram of a digital delay-locked loop in the synchronization control unit of the active rectifier according to an embodiment of the present invention.

FIG. 4 is a more detailed block diagram of a digital DLL 40 in the synchronization control unit of the active rectifier according to an embodiment of the present invention.

Referring to FIG. 4, each of the first to the fourth DLLs 165, 166, 167 and 168 of the synchronization control unit 16 may include a two-step digital DLL 40.

The two-step digital DLL 40 may be configured to include a coarse delay line 41, a fine delay line 42, a phase selector 43, a replica delay line 44, a coarse phase detector 45, an up/down counter 46, a fine phase detector 47, and a shift register 48.

The coarse delay line 41 includes a plurality of serially connected delay cells whose delay time is determined in response to an n-bit coarse delay control signal C_DELAY, and outputs a coarse delay comparison signal VCDL by passing a comparison signal VCOM through the plurality of delay cells.

The fine delay line 42 outputs a plurality of candidate delay signals whose phase is slightly delayed to a plurality of serially connected delay cells 421, respectively, while passing the coarse delay comparison signal VCDL through the plurality of delay cells 421.

The phase selector 43 selects one (e.g., a candidate delay signal at the center) of the candidate delay signals in response to an initialized m-bit fine delay control signal F_DELAY while the coarse delay lock signal COARSE_LOCK is not activated, that is, in the case of a coarse delay compensation loop, and outputs the selected candidate delay signal as a delay-compensated switch control signal VG.

The selected candidate delay signal is applied to the replica delay line 44. The replica delay line 44 includes a plurality of serially connected delay cells, and is configured to further perform delay by the delay time TDCOM of the comparator 161. If even the delay of the level shifter 13 or 14 is to be compensated for, the replica delay line 44 is configured to perform delay corresponding to the sum of the delay times of the comparator 163 and the level shifter 13.

The replica delay line 44 generates a first reference delay signal VCPD by delaying the selected candidate delay signal.

The coarse phase detector 45 compares the phase of the comparison signal VCOM output by the comparator 161 with the phase of the first reference delay signal VCPD obtained after the candidate delay signal passes through the replica delay line 44 and outputs a coarse up/down signal UPC/DNC.

The up/down counter 46 counts the coarse up/down signal UPC/DNC, and outputs an n-bit coarse delay control signal C_DELAY to the coarse delay line 41.

As described above, a coarse delay compensation loop is formed.

If it is determined that coarse delay has been completed because the difference between the phases of the comparison signal VCOM and the first reference delay signal VCPD is not detected any longer, the coarse phase detector 45 may output a coarse delay lock signal COARSE_LOCK.

In response to the coarse delay lock signal COARSE_LOCK, the state of the coarse delay line 41, the coarse phase detector 45 and the up/down counter 46 are fixed, and the replica delay line 44 generates a second reference delay signal VFPD by delaying the selected candidate delay signal.

The fine phase detector 47 compares the phase of the comparison signal VCOM with the phase of the second reference delay signal VFPD, and outputs the fine up/down signal UPF/DNF.

The shift register 48 outputs the m-bit fine delay control signal F_DELAY to the phase selector 43 in such a way as to shift a selected bit in response to the fine up/down signal UPF/DNF.

As described above, a fine delay compensation loop is formed.

If an analog DLL is used, there is a need for a feedback loop for detecting a signal from the gate of each switch and applying the signal to the comparator through the analog DLL. Furthermore, the power consumption of the analog DLL itself is high and an efficiency improvement effect is halved because a high-capacity loop filter or charge pump is required in order to guarantee the required amount of delay.

In contrast, the two-step digital delay compensation configuration according to an embodiment of the present invention does not require any feedback loop to be formed outside the synchronization control unit 16, has very low consumption power, and occupy a small area while using a maximum of four DLLs.

Figure 5:
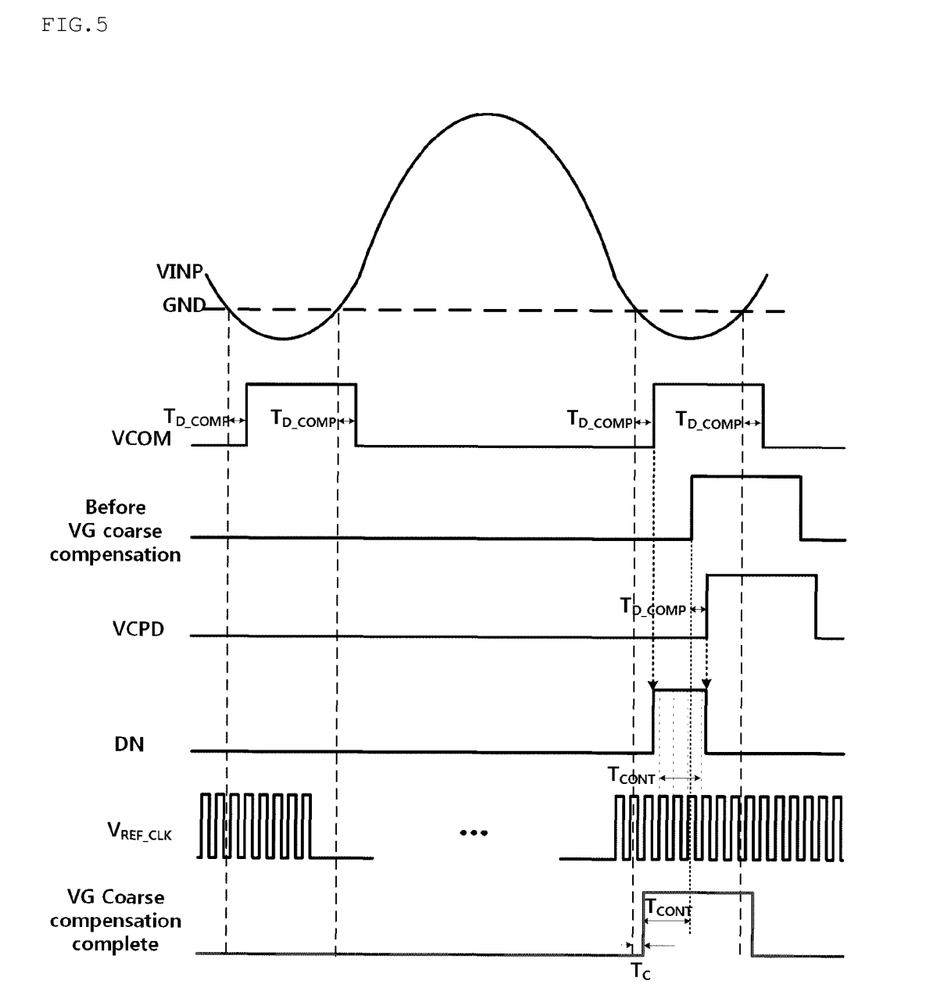
FIG. 5 is a waveform diagram illustrating switching delay components and a switch control signal whose delay has been coarsely compensated for in the active rectifier according to an embodiment of the present invention.

FIG. 5 is a waveform diagram illustrating switching delay components and a switch control signal whose delay has been coarsely compensated for in the active rectifier according to an embodiment of the present invention.

Referring to FIG. 5, the comparison signal VCOM that needs to be accurately generated when the voltage of the first terminal VINP of the AC input AC turns from positive to negative or from negative to positive according to the operation of the two-step digital DLL 40 of FIG. 4 is generated with a delay of a specific delay time $T_{D\_COMP}$ while passing through the comparator 161.

When coarse delay is initially compensated for, the coarse delay comparison signal VCDL is delayed by the initialized coarse delay line 41, thereby having a phase out of accurate zero-crossing time.

The coarse delay comparison signal VCDL is applied to the fine delay line 42. For example, the center candidate delay signal of the candidate delay signals output by the respective delay cells of the fine delay line 42 is selected based on the initial value of the m-bit fine delay control signal F_DELAY. The selected candidate delay signal is first output as a delay-compensated switch control signal VG.

In response thereto, the coarse phase detector 45 compares the phase of the comparison signal VCOM with the phase of the first reference delay signal VCPD that has passed through the replica delay line 44 configured to delay the selected candidate delay signal by the delay time TD_COMP of the comparator and generates the coarse up/down signal UPC/DNC. If even the delay of the level shifter 13 or 14 is to be compensated for, the replica delay line 44 is configured to perform delay by, for example, the sum of the delay times of the comparator 163 and the level shifter 13.

In the above example, the coarse phase detector 45 outputs the coarse down signal DNC because the phase of the first reference delay signal VCPD is considerably later than that of the comparison signal VCOM.

The coarse phase detector 45 outputs the coarse down signal DNC for each loop until the difference between the phases of the comparison signal VCOM and the first reference delay signal VCPD is reduced to detection resolution or less.

Furthermore, the up/down counter 46 continues to control the coarse delay control signal C_DELAY so that the delay time of the coarse delay line 41 is reduced while the coarse down signal DNC is applied thereto.

If the coarse phase detector 45 reduces the difference between the phases of the comparison signal VCOM and the first reference delay signal VCPD to detection resolution or less, coarse delay compensation is completed. In this case, from FIG. 5, it may be seen that the delay of the coarse delay comparison signal VCDL has been significantly compensated towards a target switching time, but the coarse delay comparison signal VCDL still has some delay TC.

Figure 6:
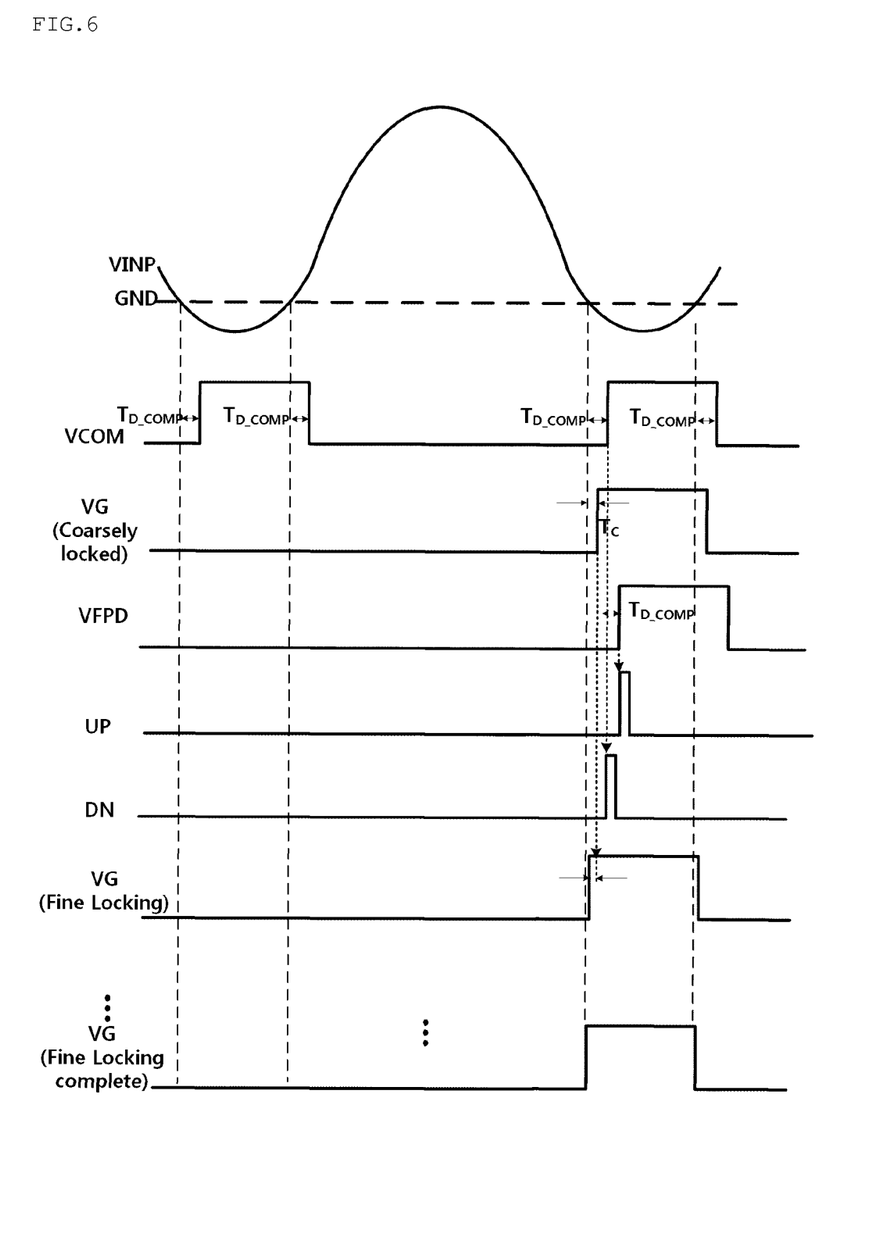
FIG. 6 is a waveform diagram illustrating switching delay components and a switch control signal whose delay has been finely compensated for in the active rectifier according to an embodiment of the present invention.

FIG. 6 is a waveform diagram illustrating switching delay components and a switch control signal whose delay has been finely compensated for in the active rectifier according to an embodiment of the present invention.

Referring to FIG. 6, at the initial stage of fine delay compensation, the fine delay line 42 outputs a candidate delay signal, selected from the candidate delay signals finely delayed in the respective delay cells based on the coarse delay comparison signal VCDL having some delay TC not compensated for in FIG. 5, as the delay-compensated switch control signal VG.

The fine phase detector 47 compares the selected candidate delay signal, that is, the second reference delay signal VFPD, delayed while the delay-compensated switch control signal VG passes through the replica delay line 44 and set as the delay time TD_COMP of the comparator 161, with the comparison signal VCOM. If even the delay of the level shifter 13 or 14 needs to be compensated for, the replica delay line 44 is configured to perform delay by the sum of the delay times of the comparator 163 and the level shifter 13.

The fine phase detector 47 outputs the fine up/down signal UPF/DNF based on the difference between the phases of the second reference delay signal VFPD and the comparison signal VCOM.

In the example of FIG. 6, since the second reference delay signal VFPD is slower, the delay of the second reference delay signal VFPD continues to be reduced, that is, the fine down signal DNF continues to be generated.

The second reference delay signal VFPD is more delayed than the delay-compensated switch control signal VG by the delay time of the comparator 161 or the delay time of the comparator 163 and the level shifter 13. The comparison signal VCOM is more delayed than zero-crossing point, by the delay time of the comparator 161. Accordingly, if the phase of the second reference delay signal VFPD is synchronized with that of the comparison signal VCOM, the delay-compensated switch control signal VG precedes the comparison signal VCOM by the delay time of the comparator 161 or the delay time of the comparator 163 and the level shifter 13.

Accordingly, the switch control signal VG rather go ahead of the comparison signal VCOM by the delay time of the comparator 161, while the comparison signal VCOM is delayed by the delay time of the comparator 161 from the zero-crossing. Thus the switch control signal VG may manage to compensate the delay time of the comparator 161 and be synchronized with the zero-crossing.

Furthermore, the switch control signal VG may go ahead of the comparison signal VCOM by the delay times of the comparator 163 and the level shifter 13, and pass the level shifter 13 to be delayed by the delay time of the level shifter 13, while the comparison signal VCOM is delayed by the delay time of the comparator 161 from the zero-crossing. Thus the switch control signal VG may manage to compensate the delay times of the comparator 163 and the level shifter 13 and be synchronized with the zero-crossing.

Figure 7:
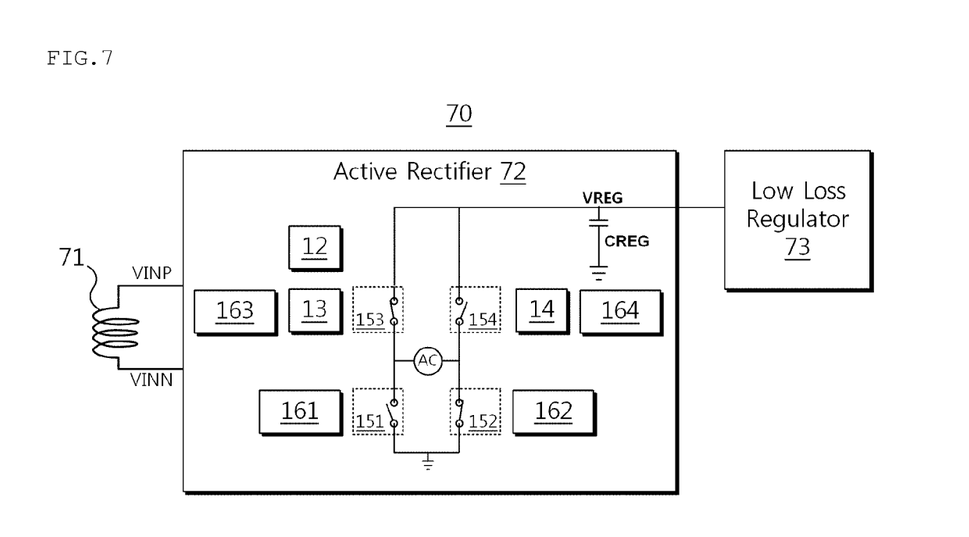
FIG. 7 is a conceptual diagram illustrating a wireless power reception apparatus including the active rectifier according to an embodiment of the present invention.

FIG. 7 is a conceptual diagram illustrating a wireless power reception apparatus including the active rectifier according to an embodiment of the present invention.

Referring to FIG. 7, the wireless power reception apparatus 70 may include a resonant reception coil 71, an active rectifier 72, and a low loss regulator 73.

The resonant reception coil 71 receives a radio signal transmitted by a wireless power transmission apparatus (not illustrated), and generates the waveform of the AC input AC.

The active rectifier 72 includes the first and the fourth switches 151 and 154 turned on while the voltage of the AC input AC is negative and configured to apply the current of the AC input AC to the rectifying capacitor CREG, and the second and the third switches 152 and 153 turned on while the voltage of the AC input AC is positive and configured to apply the current of the AC input AC to the rectifying capacitor CREG.

In this case, one end of each of the first switch 151 and the second switch 152 is connected to the ground level GND, and one end of each of the third switch 153 and the fourth switch 154 is connected to the rectifying capacitor CREG.

Each of the first to fourth switches 151, 152, 153 and 154 may be implemented using an N channel field effect transistor. The active rectifier 72 may further include the level shifters 13 and 14 for compensating for a threshold voltage for the switching of the third and the fourth switches 153 and 154.

Furthermore, the active rectifier 72 compensates for the delay times of the comparators 161 and 162 for detecting zero-crossing of the AC input AC so that the first and the second switches 151 and 152 switch, and compensates for the delay times of the comparators 163 and 164 for detecting zero-crossing of the AC input AC and the level shifters 13 and 14 so that the third and the fourth switches 153 and 154 switch.

Detailed embodiments in which the active rectifier 72 compensates for the delay time through the two-step digital DLLs have been described in detail with reference to FIGS. 4 to 6.

The active rectifier 72 may further include the voltage booster 12 configured to generate the boost voltage VBOOST and supply it to the first and the second level shifters 13 and 14 so that the first and the second level shifters 13 and 14 can operate in a voltage level higher than a peak voltage level of the AC input AC by at least the threshold voltage of a semiconductor device.

Figure 8:
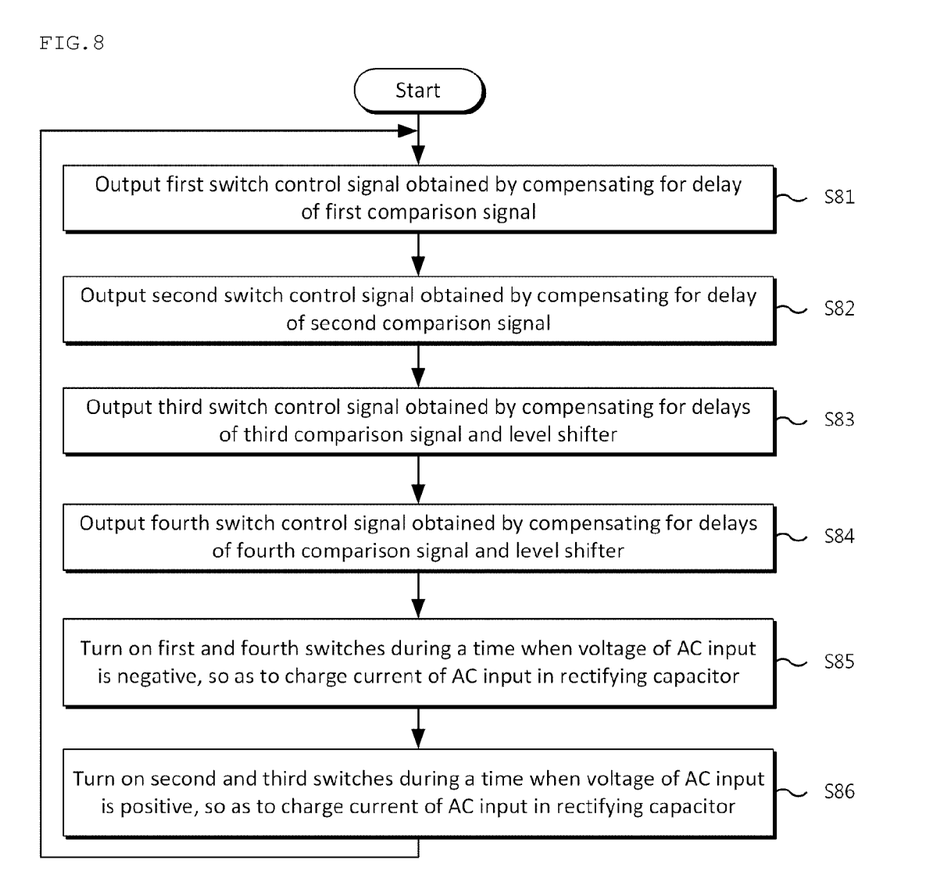
FIG. 8 is a flowchart illustrating a method of controlling the synchronization of the active rectifier according to an embodiment of the present invention.

FIG. 8 is a flowchart illustrating a method of controlling the synchronization of the active rectifier according to an embodiment of the present invention.

Referring to FIG. 8, the method of controlling the synchronization of the active rectifier 10, including the first and the fourth switches 151 and 154 turned on while the voltage of the AC input AC is negative and configured to apply the current of the AC input AC to the rectifying capacitor CREG, and the second and the third switches 152 and 153 turned on while the voltage of the AC input AC is positive and configured to apply the current of the AC input AC to the rectifying capacitor CREG and further including the level shifters 13 and 14 configured to compensate for the threshold voltages of the third and the fourth switches 153 and 154, starts with step S81.

At step S81, the delay of the first comparison signal VCOM1 output by the first comparator 161, which is attributable to the first comparator 161, is compensated for so that it is activated when the AC input AC switches from positive to negative and deactivated when the AC input AC switches from negative to positive. The delayed first comparison signal VCOM1 is output as the first switch control signal VG1.

At step S82, the delay of the second comparison signal VCOM2 output by the second comparator 162, which is attributable to the second comparator 162, is compensated for so that it is activated when the AC input AC switches from negative to positive and deactivated when the AC input AC switches from positive to negative. The delayed second comparison signal VCOM2 is output as the second switch control signal VG2.

At step S83, the delay of the third comparison signal VCOM3 output by the third comparator 163, which is attributable to the third comparator 163 and the level shifter 13, is compensated for so that it is activated when the AC input AC switches from negative to positive and deactivated when the AC input AC switches from positive to negative. The delayed third comparison signal VCOM3 is output as the third switch control signal VG3.

At step S84, the delay of the fourth comparison signal VCOM4 output by the fourth comparator 164, which is attributable to the fourth comparator 164 and the level shifter 14, is compensated for so that it is activated when the AC input AC switches from positive to negative and deactivated when the AC input AC switches from negative to positive. The delayed fourth comparison signal VCOM4 is output as the fourth switch control signal VG4.

At step S85, the first and the fourth switches 151 and 154 are turned on using the first and the fourth switch control signals in the section in which the voltage of the AC input AC is negative, and the current of the AC input AC is applied to the rectifying capacitor CREG.

At step S86, the second and the fourth switches 152, 153 are turned on using the second and the third switch control signals in the section in which the voltage of the AC input AC is positive, and the current of the AC input AC is applied to the rectifying capacitor CREG.

Figure 9:
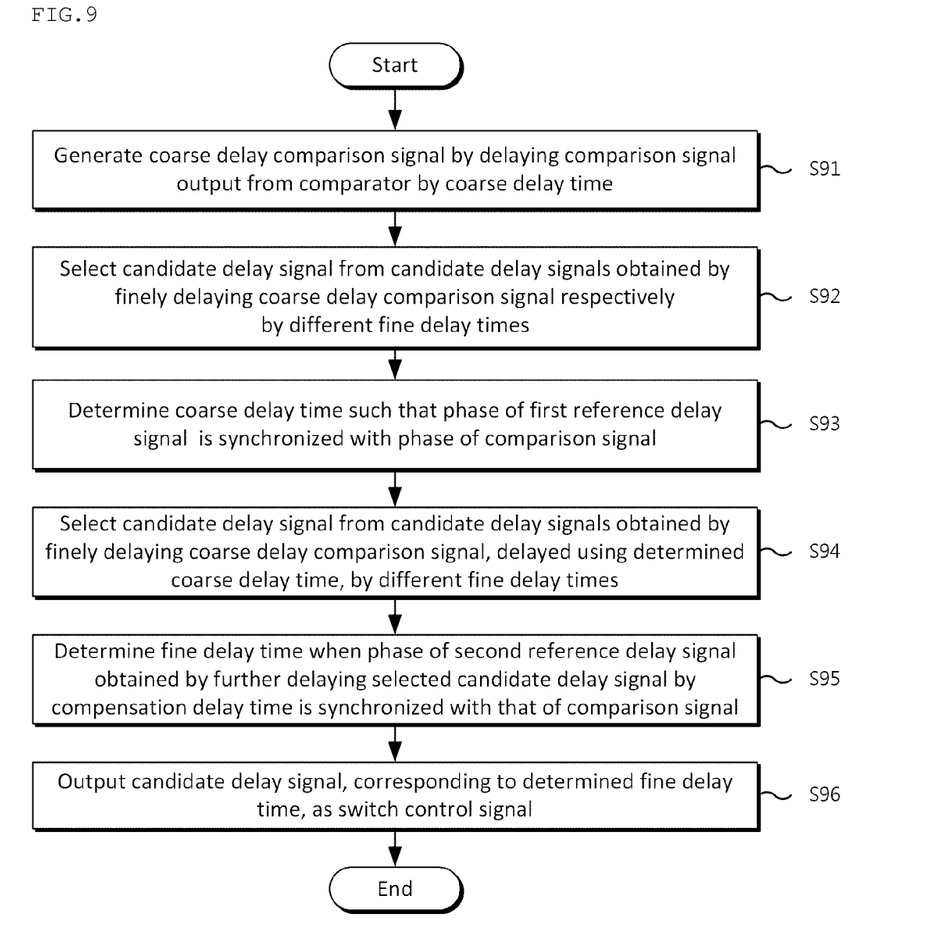
FIG. 9 is a flowchart illustrating a delay compensation method of controlling the synchronization of the active rectifier according to an embodiment of the present invention.

The compensation of delay at steps S81 to S84 may be performed, as illustrated in FIG. 9.

FIG. 9 is a flowchart illustrating a delay compensation method of controlling the synchronization of the active rectifier according to an embodiment of the present invention.

At step S91, the coarse delay comparison signal VCDL is generated by delaying the comparison signal VCOM, output from the comparator 161, by a coarse delay time.

At step S92, a candidate delay signal is selected from candidate delay signals obtained by finely delaying the coarse delay comparison signal VCDL by different fine delay times.

At step S93, a coarse delay time is determined by repeating steps S91 and S92 such that the phase of a first reference delay signal VCPD is synchronized with the phase of the comparison signal VCOM. The first reference delay signal VCPD may be obtained by further delaying the selected candidate delay signal by a compensation delay time.

The compensation delay time is a delay time to be compensated for. The compensation delay time may be the delay times of the comparators 161 and 162 in the case of the first and second switch control signals VG1 and VG2, and may be the sum of the delay times of the comparators 163 and 164 and the level shifters 13 and 14 in the case of the third and the fourth switch control signals VG3 and VG4.

At step S94, a candidate delay signal is selected from candidate delay signals obtained by finely delaying the coarse delay comparison signal VCDL by different fine delay times. The coarse delay comparison signal VCDL is delayed using the determined coarse delay time, previously at step 91.

At step S95, a fine delay time is determined such that the phase of the second reference delay signal VFPD obtained by further delaying the selected candidate delay signal by the compensation delay time is synchronized with that of the comparison signal VCOM.

At step S96, a candidate delay signal corresponding to the determined fine delay time is output as the switch control signal VG.

As described above, in accordance with the active rectifier and the wireless power reception apparatus using the same according to at least some embodiments of the present invention, a reverse current leakage can be reduced using a delay compensation means for compensating for a delay time it takes to turn off active elements.

In accordance with the active rectifier and the wireless power reception apparatus using the same according to at least some embodiments of the present invention, efficiency can be significantly improved by effectively reducing a reverse current leakage.

In accordance with the active rectifier and the wireless power reception apparatus using the same according to at least some embodiments of the present invention, the power loss of active elements themselves can be reduced because the active elements are implemented based on NMOSs.

The above embodiments and the accompanying drawings are intended merely to clearly illustrate part of the technical M spirit of the present invention, and it will be apparent to those skilled in the art that modifications and specific embodiments that those skilled in the art can easily derive from the present specification and the accompanying drawings are all included in the range of the rights of the present invention.

What is claimed is:

1. An active rectifier, comprising:
    first and fourth switches configured to be turned on while a voltage of an alternating current (AC) input is negative so as to apply a current of the AC input to a rectifying capacitor;
    second and third switches configured to be turned on while the voltage of the AC input is positive so as to apply the current of the AC input to the rectifying capacitor;
    a synchronization control unit configured to compensate for a delay time of a comparator configured to detect zero-crossing of the AC input, by switching the first, second, third, and fourth switches; and
    a first level shifter and a second level shifter configured to compensate for a threshold voltage by switching the third switch and the fourth switch, respectively.

2. The active rectifier of claim 1, wherein the first, second, third, and fourth switches are implemented using N channel field effect transistors.

3. The active rectifier of claim 1, further comprising a voltage booster configured to generate a boost voltage and supply the boost voltage to the first and second level shifters so that the first and the second level shifters operate at a voltage level higher than a peak voltage level of the AC input by at least a gate voltage of a semiconductor device configured to control terminals of the third and fourth switches.

4. The active rectifier of claim 1, wherein the synchronization control unit comprises a digital delay-locked loop (DLL) configured to:
    generate a delay comparison signal by delaying a comparison signal output by the comparator;
    generate a reference delay signal by passing the delay comparison signal through a replica delay line having a compensation delay time identical with the delay time of the comparator or a sum of the delay time of the comparator and a delay time of the first level shifter; and
    generate first, second, third, and fourth switch control signals to switch the first, second, third, and fourth switches, respectively, based on the delay comparison signal obtained by synchronizing the reference delay signal with the comparison signal.

5. The active rectifier of claim 4, wherein the synchronization control unit is further configured to:
    generate a first coarse delay comparison signal by delaying the comparison signal output from the comparator by a coarse delay time;
    select a first candidate delay signal from candidate delay signals obtained by finely delaying the first coarse delay comparison signal by different fine delay times;
    determine the coarse delay time so that a phase of a first reference delay signal, obtained by further delaying the selected first candidate delay signal by the compensation delay time, is synchronized with a phase of the comparison signal;
    select a second candidate delay signal from candidate delay signals obtained by further finely delaying a second coarse delay comparison signal by different fine delay times, wherein the second coarse delay comparison signal is delayed by the determined coarse delay time;
    determine a fine delay time, in response to a phase of a second reference delay signal, obtained by further delaying the selected second candidate delay signal by another compensation delay time, being synchronized with the phase of the comparison signal; and
    output a third candidate delay signal, corresponding to the determined fine delay time, as a switch control signal.

6. The active rectifier of claim 4, wherein the digital DLL comprises:
    a coarse delay line for comprising a first plurality of serially connected delay cells, wherein each delay cell of the first plurality of delay cells comprises delay times determined in response to a coarse delay control signal so as to output a coarse delay comparison signal by passing the comparison signal through the first plurality of delay cells;
    a fine delay line configured to output a plurality of candidate delay signals, wherein phases of the plurality of candidate delay signals are gradually delayed from each delay cell of a second plurality of delay cells while passing the coarse delay comparison signal through the second plurality of delay cells;
    a phase selector configured to select a candidate delay signal from the plurality of candidate delay signals, in response to a fine delay control signal;
    a replica delay line configured to delay the selected second candidate delay signal by the compensation delay time;
    a coarse phase detector configured to synchronize a phase of the comparison signal with a phase of a first reference delay signal so as to output a coarse delay lock signal, wherein the first reference delay signal is obtained by passing the selected candidate delay signal through the replica delay line;
    a fine phase detector configured to synchronize the phase of the comparison signal with a phase of a second reference delay signal in response to the coarse delay lock signal, wherein the second reference delay signal is obtained by passing the selected candidate delay signal through the replica delay line; and a shift register configured to generate the fine delay control signal based on a comparison between the phase of the comparison signal and the phase of the second reference delay signal so as to output the generated fine delay control signal to the phase selector.

7. A wireless power reception apparatus, comprising:
a resonant reception coil configured to receive a radio signal, and generate an AC input from the radio signal;
an active rectifier for comprising
 first and fourth switches configured to be turned on while a voltage of the AC input is negative so as to apply a current of the AC input to a rectifying capacitor,
 second and third switches configured to be turned on while the voltage of the AC input is positive so as to apply the current of the AC input to the rectifying capacitor,
 a synchronization control unit configured to compensate for a delay time of a comparator configured to detect zero-crossing of the AC input by switching the first, second, third, and fourth switches, and
 a first level shifter and a second level shifter configured to compensate for a threshold voltage by switching the third switch and the fourth switch, respectively; and
a regulator configured to generate a DC voltage from a voltage charged in the rectifying capacitor,
wherein the first, second, third, and fourth switches are implemented using N channel field effect transistors.

8. A delay compensation method of controlling a synchronization of an active rectifier, the active rectifier comprising first and fourth switches turned on while a voltage of an AC input is negative so as to apply a current of the AC input to a rectifying capacitor, and second and third switches turned on while a voltage of the AC input is positive so as to apply a current of the AC input to the rectifying capacitor, the delay compensation method comprising:
 generating a first coarse delay comparison signal by delaying a comparison signal, output from a comparator configured to detect zero-crossing of the AC input, by a first delay time;
 selecting a first candidate delay signal from candidate delay signals obtained by delaying the first coarse delay comparison signal by first different fine delay times;
 determining a second coarse delay time such that a phase of a first reference delay signal, obtained by further delaying the selected first candidate delay signal by a compensation delay time, is synchronized with a phase of the comparison signal;
 selecting a second candidate delay signal from candidate delay signals obtained by further delaying a second coarse delay comparison signal by second different fine delay times, wherein the second coarse delay comparison signal is delayed by the determined second coarse delay time;
 determining a fine delay time such that a phase of a second reference delay signal, obtained by further delaying the selected second candidate delay signal by another compensation delay time, is synchronized with the phase of the comparison signal; and outputting a third candidate delay signal, corresponding to the determined fine delay time, as a switch control signal.

9. The delay compensation method of claim 8, wherein:
the active rectifier further comprises level shifters configured to compensate for threshold voltages of the third and the fourth switches; and
the compensation delay time is a sum of delay times of the comparator and a level shifter among the level shifters.

10. A method of controlling a synchronization of an active rectifier, the active rectifier comprising first and fourth switches implemented using N channel field effect transistors and turned on while a voltage of an AC input is negative so as to apply a current of the AC input to a rectifying capacitor, second and third switches implemented using N channel field effect transistors and turned on while the voltage of the AC input is positive to apply the current of the AC input to the rectifying capacitor, a synchronization control unit configured to compensate for a delay time of a first, second, third, and fourth comparator configured to detect zero-crossing of the AC input, by switching the first, second, third, and fourth switches, and a first level shifter and a second level shifter configured to compensate for a threshold voltage by switching the third switch and the fourth switch, respectively, the method comprising:
 outputting a first switch control signal by compensating a first comparison signal for a delay of the first comparator, wherein the first comparison signal is output by the first comparator so as to be activated in response to the AC input turning from positive to negative and deactivated in response to the AC input turning from negative to positive;
 outputting a second switch control signal by compensating a second comparison signal for a delay of the second comparator, wherein the second comparison signal is output by the second comparator so as to be activated in response to the AC input turning from negative to positive and deactivated in response to the AC input turning from positive to negative;
 outputting a third switch control signal by compensating a third comparison signal for a delay of the third comparator, the third comparison signal being output by the third comparator so as to be activated in response to the AC input turning from negative to positive and deactivated in response to the AC input turning from positive to negative;
 outputting a fourth switch control signal by compensating a fourth comparison signal for a delay of the fourth comparator, wherein the fourth comparison signal is output by the fourth comparator so as to be activated in response to the AC input turning from positive to negative and deactivated in response to the AC input turning from negative to positive;
 turning on the first and the fourth switches using the first and the fourth switch control signals while the voltage of the AC input is negative, so as to apply the current of the AC input to the rectifying capacitor; and
 turning on the second and the third switches using the second and the third switch control signals while the voltage of the AC input is positive, so as to apply the current of the AC input to the rectifying capacitor.

* * * * *